United States Patent

[11] 3,611,128

| [72] | Inventor | Minoru Nagata<br>Kodaira-shi, Japan |
|---|---|---|
| [21] | Appl. No. | 844,098 |
| [22] | Filed | July 23, 1969 |
| [45] | Patented | Oct. 5, 1971 |
| [73] | Assignee | Hitachi, Ltd.<br>Tokyo, Japan |
| [32] | Priority | July 26, 1968 |
| [33] | | Japan |
| [31] | | 43/52466 |

[54] PROBE HEADER FOR TESTING INTEGRATED CIRCUITS
5 Claims, 9 Drawing Figs.

[52] U.S. Cl. .................................................. 324/72.5,
324/158 P
[51] Int. Cl. .................................................. G01r 31/02
[50] Field of Search .......................................... 324/72.5,
158 R, 158 F, 158 P, 149, 158; 339/149, 174, 17
CF, 176 M, 176 MP, 119, 99, 206

[56] References Cited
UNITED STATES PATENTS

| 3,044,508 | 7/1962 | Sherman | 200/166 |
| 3,437,929 | 4/1969 | Glenn | 324/158 |
| 3,492,447 | 1/1970 | McFadden | 200/166 |

OTHER REFERENCES

J. F. Smith, IBM Technical Disclosure Bulletin, Vol. 8, No. 11, April 1966, p. 1478

Primary Examiner—Alfred E. Smith
Attorney—Craig, Antonelli and Hill

ABSTRACT: A probe header having a plurality of probes for effecting a temporary test connection with integrated circuits on a semiconductor wafer, the probes of which are assembled into a plurality of integral units, each unit being mounted on a position adjusting means thereby enabling simultaneous adjustment of a plurality of probes at each probe unit.

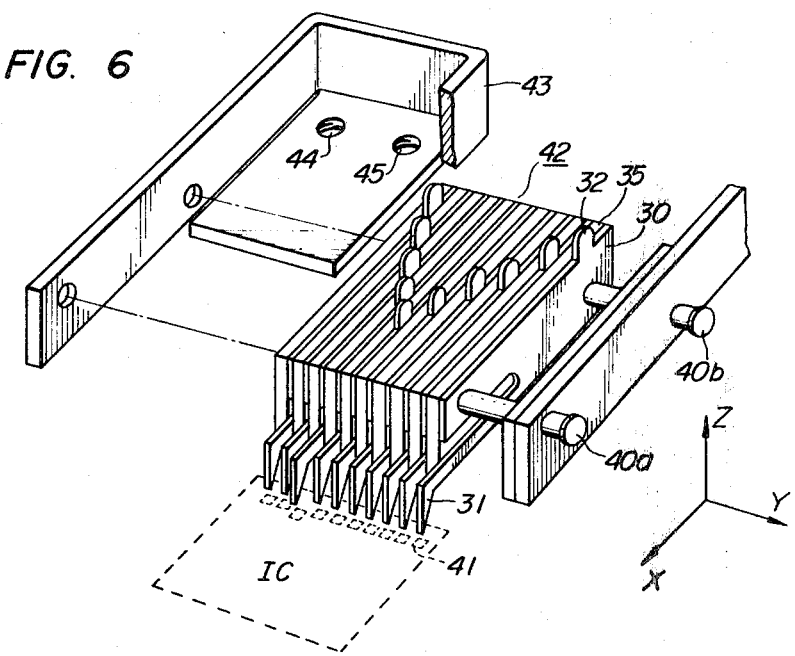
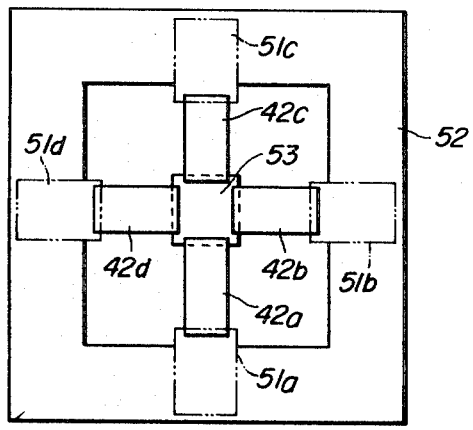
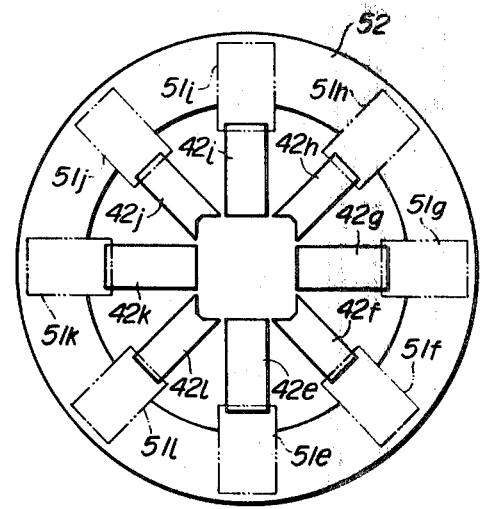
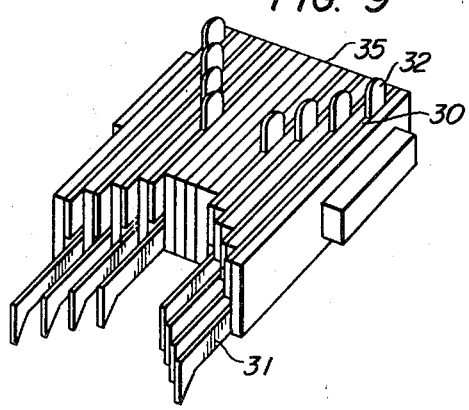

PROBE HEADER FOR TESTING INTEGRATED CIRCUITS

BACKGROUND OF THE INVENTION

1. Field of the Invention

The present invention relates to a probe-header for effecting a temporary test connection with connection pads of integrated circuits on a semiconductor wafer, and more particularly to a connecting equipment having a plurality of probes for testing the characteristics of integrated circuits having a relatively large number of terminals.

2. Description of the Prior Art

Integrated circuits, especially monolithic integrated circuits (hereinafter referred to as IC's) are manufactured on a large scale at each semiconductor wafer with a batch system. These IC's are usually subjected to a test of their electrical characteristics in a state that they are arranged on a wafer before they are divided into discrete chips. This is for the purpose that only those IC chips which have desirable characteristics are subjected to the subsequent complicated assembly. The test of the characteristics is made for individual IC's arranged on the wafer by carrying out several tens of kinds of measurements by applying the necessary operating voltages and necessary testing signals thereto. For this test, a connecting equipment having a plurality of probes commonly called a "prober" is employed as an equipment for connecting terminals of individual IC's to outer circuits such as the power supply and measuring instruments.

What is required of the prober is that its probes the number of which is the same as that of the terminals, i.e. pads of IC's on a semiconductor wafer can easily register and perfectly electrically connect with the corresponding pads without short-circuiting with each other and without injuring the pads by their tips.

Taking these conditions into account, the conventional prober has had a probe header fundamentally as show in FIG. 1 in which a plurality of probes each equipped with a position adjusting means are mounted on a support ring. In FIG. 1, each probe 10 is supported by a probe holder 11 which is equipped with a position adjusting means 12 mounted on a support ring 13 for adjusting the position of the tip of the probe 10. The probe is further provided with a terminal plate 14 for a predetermined electrical connection.

The position adjusting means 12 which can control the position of the probe 10 in the X-, Y- and Z-directions is shown in FIG. 2 in cross section. The probe holder 11 is coupled with a resilient holder plate 15 which has three apertures 16, 17 and 18 as is shown in FIG. 3. The holder plate 15 is mounted on the ring 13 with a screw 20 in such a manner that it is interposed between the ring 13 and the terminal plate 14. If a screw 21 attached to the probe holder 11 is rotated, the probe holder 11 moves up and down, thereby controlling the position of the probe 10 in the Z-direction. Screws 22 and 23 have eccentric projections 22a and 23a which are inserted in the apertures 16 and 17 of the holder plate 15, respectively. By rotating the screw 22 the holder plate 15 moves in the X-direction and by rotating the screw 23 the holder plate 15 moves in the Y-direction, thereby controlling the position of the probe 10 in the X- and Y-directions. A plate 19 for pressing the probe holder 11 against the terminal plate 14 is mounted on the ring 13 with the screw 20.

Although the conventional structure of a probe header in which individual probes 10 are mounted on the ring 13 independently of each other as described above is practical for testing an IC having a relatively few number of pads, for example ranging from 10 to 16, it is difficult to apply it to a large scale integrated circuit commonly called MSI or LSI which has a large number of pads, for example several tens to several hundreds of pads. This is because, according to the above-described conventional structure, there is a limitation to the miniaturization of the probe and position adjusting means resulting in a limitation to the number of the probes to be mounted on the ring. In this case, since the miniaturization of the position adjusting means has a direct relationship to the accuracy of registration, and since the miniaturization makes the registration difficult, the size of the probe header unavoidable becomes large to achieve the required accuracy and required number of probes. Further, according to the conventional structure, since registration should be effected for each probe, the larger the number of probes, the more highly skilled and time consuming labor is necessary for the registration, and hence the handling and maintenance of the header becomes difficult. For this reason, it is required to exploit a novel probe header which can overcome these disadvantages for manufacturing MSI's and LSI's.

SUMMARY OF THE INVENTION

An object of the present invention is to provide a probe header of a novel structure capable of increasing the number of probes as compared with the conventional probe header and facilitating the registration of the probes.

The present invention is characterized in that an appropriate number of probes are assembled into a unit so that they align with pads, and a position adjusting means for registration is provided for each unit, thereby enabling the miniaturization of the probe and simultaneous registration of plural probes. According to the present invention a probe unit can be provided in which a plurality of very fine probes are exactly arranged with predetermined intervals by alternately stacking plate shaped probes cutout of a conductor plate and spacers made of insulator material having a thickness equal to the spacing between the pads of an integrated circuit. By employing this structure of unit the number of probes can be increased and a probe header can easily be fabricated which would have been difficult according to the conventional structure.

For better understanding of the present invention, preferred embodiments of the invention will now be described with reference to the accompanying drawings.

BRIEF DESCRIPTION OF THE DRAWING

FIG. 6 is an exploded view of a probe unit formed by assembling the probes as shown in FIG. 4 and the spacers as shown in FIG. 5;

FIGS. 7 and 8 are schematic diagrams illustrating the constructions of the probe header according to the invention; and FIG. 9 is a perspective view of another embodiment of the probe unit employed in the probe header of the invention.

DESCRIPTION OF THE PREFERRED EMBODIMENTS

Figure 4:
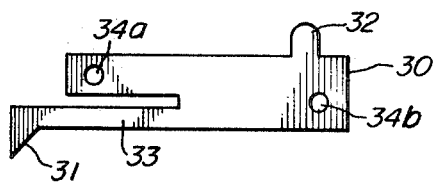
FIG. 4 is a schematic diagram of an example of the probe employed in the present invention.
Figure 5:
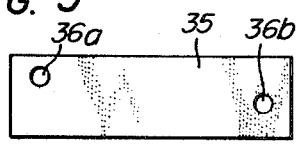
FIG. 5 is a schematic diagram of an example of the spacer employed for isolating probes in the present invention.

In the present invention plate shaped probes 30, for example, as shown in FIG. 4 are employed. The probe 30 is formed from a resilient metal plate, for example a phosphor bronze plate having a thickness of 50 microns by photoetching. The probe 30 comprises a contact portion 31 which is to come into contact with a pad of an integrated circuit, and a terminal portion 32 for connection with an external circuit. The contact portion has an arm 33 for assuring adequate pressure press against the pad. A plurality of probes 30 are stacked alternately with spacer 35 as shown in FIG. 5 made from a plate of insulating material such as mylar (trade mark of du Pont for their polyester film) by photoetching to be assembled into a unit. In this case, it is desireable to form the spacer into a shape that cover a major part of the arm portion of the adjacent probe so as to restrict the moving direction of the arm portion to only such direction as along the spacer surface, i.e. the Z-direction. Further in this case, if the unit is composed of probes having the terminal portion 32 in different positions from each other, the connection of lead conductors to the terminal portions 32 of the probes in the unit is easy. Since the probes can be formed very exactly by employing the photoetching technique, it is easy to arrange the contact portions of the probes in registering relation with the pads of an integrated circuit on a semiconductor wafer by stacking the probes with spacers having an appropriate thickness interposed therebetween. When some of the pads of the integrated circuit are arranged irregularly on the wafer, it is well to employ those having arms 33 of different size as the probes corresponding to the irregular pads.

Apertures 34a and 34b formed in the probe 30 and apertures 36a and 36b formed in the spacer 35 are for inserting bolts or pins thereinto to securely hold them in a stacked relation.

FIG. 6 shows the probes assembled into a unit 42. Bolts or pins 40a and 40b hold the probes 30 in cooperation with a probe holder 43 in such a positional relationship that the contact portions thereof coincide with the array of he pads 41 of an integrated circuit indicated by broken lines.

Figure 1:
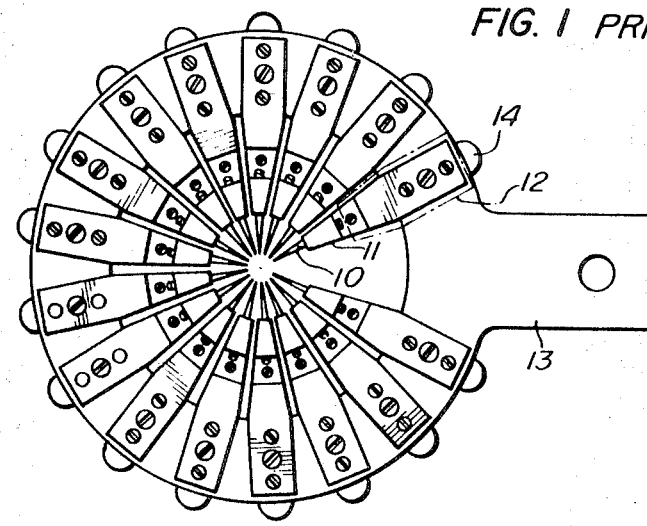
FIG. 1 is a plan view of a typical example of the conventional probe header for performing a temporary testing connection with an integrated circuit.
Figure 2:
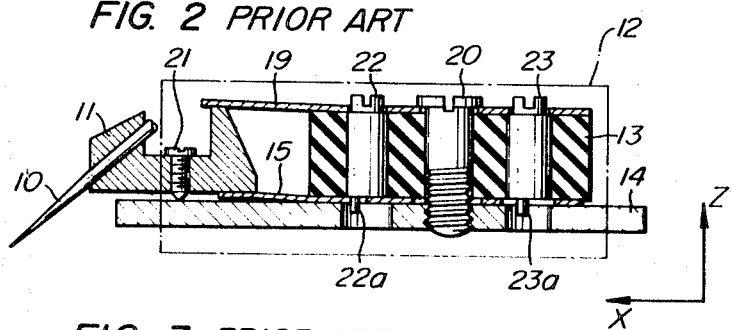
FIG. 2 is a cross-sectional view of a mechanism for adjusting the position of a probe in the probe header of FIG. 1.
Figure 3:
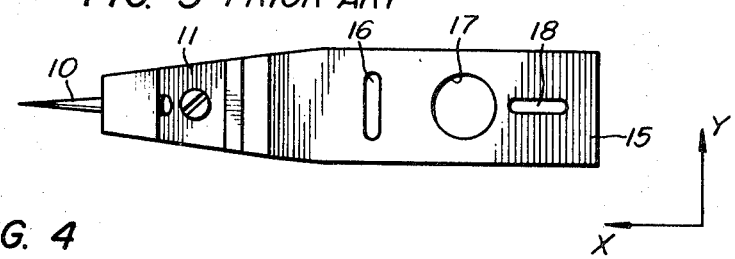
FIG. 3 is a plan view of an important member of the mechanism of FIG. 2.

According to the present invention, a position adjusting means for registration is provided for each probe unit 42 to simultaneously effect the positional control of the probes 30 of the probe unit 42. Since the probe holder 43 in the invention corresponds to the probe holder 11 shown in FIGS. 1 to 3, a typical example of the probe header according to the present invention will be understood by replacing the probe 10 and probe 11 in FIG. 2 by the probe unit 42 and probe holder 43 in FIG. 6. Thus, the probe holder 43 is mounted on the holder plate 15, and he position thereof is controlled by the screws 22 and 23 in the X- and Y-direction, and by the screw 21 in the Z-direction.

The probe header according to the present invention must be controlled in such a manner that when the probe unit 42 thereof is put on a semiconductor wafer, all the plural probes arranged on the Y-axis in FIG. 6 are brought at their contact portions 31 into contact with the corresponding pads 41 on the wafer. Therefore, it is desirable for the position adjusting means for the probe unit to further comprise means for controlling the inclination of the unit relative to the Y-axis. One method for inclination control is such that two threaded apertures 44 and 45 are provided to the probe holder 43 along the Y-axis into both of which screws for position adjustment in the Z-direction similar to the screw 21 are threaded.

In the probe header according to the present invention, since a plurality of probes are controlled by one position adjusting means different from the conventional equipment, a fewer number of position adjusting means will serve the purpose despite the fact that the number of the probes is very large. Consequently, it is not always necessary to miniaturize the position adjusting means in the equipment according to the invention, and moreover, any position adjusting means of a more complicated structure and capable of controlling the probes with higher accuracy than the position adjusting means shown in FIG. 2 can be employed.

FIG. 7 shows the structure of a probe header according to the present invention comprising four probe units 42a to 42d, position adjusting means 51a to 51d for the probe units 42a to 42d, respectively, and a support ring 52 on which the position adjusting means 51a 51d are mounted. A block 53 indicated by a broken line is an integrated circuit to be measured. Each of the probe units 42a and 42d is arranged at each side of the integrated circuit to effect a temporary test connection with the pads However, the number of the probe units can be varied as required.

FIG. 8 shows another probe header according to the present invention which comprises eight probe units 42e to 42l, eight position adjusting means 51e to 51L, and a support ring 52. Among the eight probe units 42e to 42L, particular the probe units 42f, 42h, 42j and 42l disposed at the corners of an integrated circuit to be tested are of a structure as shown in FIG. 9 in which similar parts are designated by similar reference numerals as in FIG. 6.

As has been described so far, according to the present invention the number of probes capable of being mounted on a probe-header can be markedly increased by forming the probes in a small size comparable to the pads of an integrated circuit and by stacking the probes alternately with insulating spacers at predetermined intervals so that they coincide with an array of pads to assemble into a probe unit. Although the probes and spacers employed in the present invention can be formed by various methods from materials suitable for the purpose, the photoetching method is particularly preferable because pieces can be worked with a high degree of precision and without any residual mechanical strain. By employing the thus formed pieces a probe unit can be provided in which the contact portions are arranged in predetermined positions and remain stable with time.

I claim:

1. A connecting equipment for effecting temporary connections with connection pads of integrated circuits formed on a semiconductor wafer, comprising:

a plurality of probe plates cut out respectively from a metal plate, each being composed by a body portion with an outer terminal, an arm portion extending from said body portion and a contact portion provided at the extremity of said arm portion, said arm portion being so designed so as to have said contact portion resiliently contact a connection pad of said integrated circuit;

insulating spacers inserted between said probe plates;

means for conjoining alternately stacked probe plates and said spacers to form at least one probe unit, said spacers defining intervals between adjacent probe plates so that the contact portions of said probe plates thus conjoined correspond to the positions of the pads on the wafer; and position adjusting means associated with each said probe unit for adjusting the position of said probe unit in two directions in a plane parallel to the wafer surface as well as for inclining said probe unit relative to said wafer surface;

whereby the number of said probe plates capable of being mounted in said connecting equipment can be markedly increased and said connecting equipment can be fabricated on an extremely small scale.

2. A connecting equipment according to claim 1, wherein said probe plates are assembled into the probe unit so that the positions of the outer terminals of adjacent probe plates are made to differ from each other. 12

3. A connecting equipment according to claim 1, wherein the major parts of the respective arm portions are sandwiched in between said insulating spacers, thereby restricting the moving direction of said arm portions of said probe plates in said probe unit to only such a direction as along the spacer surfaces.

4. A connecting equipment for effecting temporary connections with connection pads of integrated circuits formed on a semiconductor wafer, comprising:

a plurality of probe plates, each formed from a metal plate and having a body portion with an outer terminal, means for effecting a resilient structural and electrical connection between an integrated circuit pad and said outer terminal comprising a first arm portion extending from said body portion, a contact portion provided at the extremity of said arm portion, and a second arm portion extending in the same direction as said first arm portion and with a slot formed between said first and second arm portion; insulating spacers inserted between said probe plates;

means for conjoining alternately stacked probe plates and spacers to form at least one probe unit, said spacers defining intervals between adjacent probe plates so that the contact portions of said probe plates thus conjoined correspond to the positions of the pads on the wafers; and position adjusting means associated with each probe unit for adjusting the position of said probe unit in two directions in a plane parallel to the wafer surface and for inclining the probe unit relative to the wafer surface.

5. A connecting equipment according to claim 4, wherein said conjoining means comprises a plurality of pins passing through respective slots in said second arm portions and said body portions and a holder into which said pins are held at one end thereof.